US010819461B2

(12) United States Patent
Forbes et al.

(10) Patent No.: US 10,819,461 B2
(45) Date of Patent: Oct. 27, 2020

(54) OPTICAL COMMUNICATION METHOD AND SYSTEM

(71) Applicants: UNIVERSITY OF THE WITWATERSRAND, JOHANNESBURG, Johannesburg (ZA); CSIR, Pretori (ZA)

(72) Inventors: Andrew Forbes, Johannesburg (ZA); Angela Dudley, Pretoria (ZA); Carmelo Guadalupe Rosales Guzmán, Johannesburg (ZA)

(73) Assignee: University of the Witwaterstrand, Johannesburg, Johannesburg (ZA)

( * ) Notice: Subject to any disclaimer, the term of this patent is extended or adjusted under 35 U.S.C. 154(b) by 244 days.

(21) Appl. No.: 15/750,959

(22) PCT Filed: Aug. 5, 2016

(86) PCT No.: PCT/IB2016/054738
§ 371 (c)(1),
(2) Date: Feb. 7, 2018

(87) PCT Pub. No.: WO2017/025876
PCT Pub. Date: Feb. 16, 2017

(65) Prior Publication Data
US 2020/0092028 A1     Mar. 19, 2020

(30) Foreign Application Priority Data
Aug. 7, 2015   (ZA) .................................. 2015/05721

(51) Int. Cl.
*H04J 14/04*     (2006.01)
*H04B 10/66*     (2013.01)
(Continued)

(52) U.S. Cl.
CPC ............ *H04J 14/04* (2013.01); *H04B 10/516* (2013.01); *H04B 10/66* (2013.01);
(Continued)

(58) Field of Classification Search
CPC .... H04J 14/04; H04J 14/0201; H04J 14/0278; H04J 14/06; H04B 10/516; H04B 10/66; H04B 10/25; H04B 10/291
(Continued)

(56) References Cited

U.S. PATENT DOCUMENTS 9,768,909 B2 *   9/2017  Huang ................... H04J 14/00
9,841,555 B2 * 12/2017  Downie ............ G02B 6/02019
(Continued)

OTHER PUBLICATIONS

"Demonstration of Spatial Mode Division Multiplexing using Laguerre-Gaussian Mode Beam in telecom-wavelength", Awaji Yoshinari et al., (Jan. 20, 2011) (Year: 2011).*
(Continued)

*Primary Examiner* — Abbas H Alagheband
(74) *Attorney, Agent, or Firm* — Ohlandt, Greeley, Ruggiero & Perle, L.L.P.

(57) ABSTRACT

The invention relates to optical communication methods and systems. In particular, the invention relates to an optical communication method and system which is configured to create a multiplexed beam from an incident beam, wherein the multiplexed beam comprises a predetermined number of spatial modes simultaneously generated and multiplexed together in a fashion that is independent of wavelength. The spatial modes have two degrees of spatial freedom. The multiplexed beam is de-multiplexed downstream from multiplexing thereof in the communication system in a simultaneous fashion independent of wavelength to yield the
(Continued)

predetermined number of spatial mode. The modes are used in optical communication as channels or as bits in a bit (de) encoding scheme.

25 Claims, 8 Drawing Sheets

(51) Int. Cl.
*H04B 10/516* (2013.01)
*H04J 14/06* (2006.01)
*H04J 14/02* (2006.01)

(52) U.S. Cl.
CPC ....... *H04J 14/0201* (2013.01); *H04J 14/0278* (2013.01); *H04J 14/06* (2013.01)

(58) Field of Classification Search
USPC .......................................................... 398/44
See application file for complete search history.

(56) References Cited

U.S. PATENT DOCUMENTS

| | | | | |
|---|---|---|---|---|
| 9,998,187 | B2* | 6/2018 | Ashrafi | H04L 27/2639 |
| 10,073,417 | B2* | 9/2018 | Ashrafi | G03H 1/2645 |
| 2006/0066930 | A1* | 3/2006 | Dubois | G03H 1/28 |
| | | | | 359/27 |
| 2012/0207470 | A1* | 8/2012 | Djordjevic | H04J 14/0201 |
| | | | | 14/201 |
| 2015/0009547 | A1* | 1/2015 | Ngcobo | H01S 3/105 |
| | | | | 359/27 |
| 2015/0268399 | A1* | 9/2015 | Futterer | G02B 30/00 |
| | | | | 315/151 |
| 2015/0292941 | A1* | 10/2015 | Forbes | G01J 1/4228 |
| | | | | 356/121 |
| 2016/0041523 | A1* | 2/2016 | Ashrafi | G03H 1/2645 |
| | | | | 359/9 |
| 2016/0127073 | A1* | 5/2016 | Ashrafi | H04B 10/516 |
| | | | | 398/44 |
| 2017/0026095 | A1* | 1/2017 | Ashrafi | H04B 7/10 |
| 2018/0262243 | A1* | 9/2018 | Ashrafi | H04B 7/0469 |
| 2019/0025760 | A1* | 1/2019 | Ashrafi | G02B 26/0833 |

OTHER PUBLICATIONS

"All-optical demultiplexer based on dynamic multiple holograms for optical MIMO processing and mode division multiplexing", Oda et al., (Jan. 24, 2011) (Year: 2011).*
"World first mode/spatial division multiplexing in multi-core fiber using Laguerre-Gaussian mode", Awaji Yoshinari et al., (Sep. 22, 2011) (Year: 2011).*
"Compatibility to WDM of Volume Holographic Demultiplexer for Spatial Mode Division Multiplexing", K. Morita et al., (Jul. 9, 2010) (Year: 2010).*
International Search Report dated Jan. 20, 2017 from corresponding International Application No. PCT/IB2016/054738, 4 pages.
Nritten Opinion dated Jan. 20, 2017 from corresponding International Application No. PCT/IB2016/054738, 6 pages.
Awaji et al.; "World first mode/spatial division multiplexing in multi-core fiber using Laguerre-Gaussian mode"; ECOC Technical Digest, 2011, OSA, Jul. 27, 2011; 4 pages.
Trichili et al.; "Laguerre Gaussian beam multiplexing through turbulence"; Proc. of SPIE, vol. 9194, 2014, 6 pages.
Awaji et al.; "Demonstration of Spatial Mode Division Multiplexing using Laguerre-Gaussian Mode Beam in telecom-wavelength"; IEEE, 2010, pp. 551-552.
Oda et al.; "All-optical demultiplexer based on dynamic multiple holograms for optical MIMO processing and mode division multiplexing"; Proc. of SPIE, vol. 7958, 2011, 10 pages.

* cited by examiner

OPTICAL COMMUNICATION METHOD AND SYSTEM

FIELD OF THE INVENTION

The invention relates to optical communication methods and systems, particularly to methods and systems for increasing bandwidth for optical communication.

BACKGROUND TO THE INVENTION

The increasing growth of the worldwide data traffic in the optical communication networks creates the risks of a bandwidth "capacity crunch". Significant improvements in transmission capacity of networks have been achieved through the use of multiplexing techniques such as polarisation division multiplexing (PDM), and wavelength division multiplexing (WDM). However, these techniques may still not be able to satisfy global bandwidth capacity demands in the future.

One technique, space division multiplexing (SDM), particularly mode division multiplexing (MDM), has obtained considerable attention in the field of optical communication for its possible ability to cope with the dramatic capacity demand in optical transmission systems. In an MDM based communication system, each spatial mode, from an orthogonal modal basis, can be used as an independent information carrier which increases the total capacity by several orders of magnitude in optical fiber or in free space optics by a factor equal to the number of modes used.

Some MDM systems have realised a 41.6 Tb/s transmission capacity using 6 linearly polarised modes on dual polarisation over 74.17 km of propagation over a few mode fiber. In free space communication, some systems have reported a bit rate of 2.56 Tb/s and a spectral efficiency of 95.7 b/s/Hz using 4 orbital angular momentum (OAM). Moreover, a 400 Gbit/s transmission capacity over a free space optical link and using 4 Laguerre Gaussian modes with multiple OAM and the same higher radial order has also been achieved. OAM is a particular mode basis for optical data communication. Due to the aforementioned bandwidth realisation, OAM has become the mode of choice in many instances due to its topical nature and ease of detection with phase-only optical elements.

However, by taking into account the effects of atmospheric turbulence and crosstalk ad system bit error rate (BER) in an OAM multiplexed free space optics (FSO) link, it has been shown, at least experimentally, that turbulence induced signal fading will significantly deteriorate link performance and might cause link outage in strong turbulence. Moreover, OAM does not fully exploit the potential of MDM as it is but a mere subspace of the full space of Laguerre Gaussian (LG) beams.

It is the object of this invention to address the shortcomings of conventional MDM optical communication systems or to provide at least an alternative form of a MDM technique for increasing bandwidth in optical communications.

SUMMARY OF THE INVENTION

According to a first aspect of the invention, there is provided a method of optical communication comprising:
receiving at least one incident light beam having one or more wavelengths;
acting on the received incident light beam with a first optical element to create a single multiplexed light beam comprising a multiplex of a predetermined number of spatial modes per one or more wavelengths of the incident light beam in a manner which is independent of the one or more wavelengths of the incident light beam, wherein each of the predetermined number of spatial modes have at least two spatial degrees of freedom; and
use the multiplexed light beam for optical communication wherein the spatial modes are used as one or both of carrier channels and bits in a bit coding scheme.

It will be appreciated that the spatial modes may be generated irrespective of the one or more wavelengths of the incident light beam.

The method may comprise acting on the single incident light beam with the first optical element to:
create the predetermined number of spatial modes, each having two degrees of spatial freedom, wherein the two spatial degrees of freedom is two degrees of freedom in spatial pattern; and
apply a phase gradient to each of the spatial modes during creation thereof resulting in a grating; and
use only a first order of diffraction for creating the predetermined number of spatial modes. The method may comprise multiplexing the first order of diffraction to form the multiplexed beam. Applying the phase gradient may comprise applying a linear grating to each mode.

The method may comprise selecting the two spatial degrees of freedom from a group comprising radial and azimuthal indices of Laguerre Gaussian beams, and X and Y axis indices of Hermite-Gaussian beams in Cartesian symmetry. It will be understood that other beams having two degrees of spatial freedom may be used as the spatial modes.

The method may comprise receiving the incident light beam in the form of a data carrying light beam. The method may comprise complex-amplitude modulating the incident light beam with the first optical element to create the single multiplexed light beam in a manner that is mode selective but independent of the wavelength of the incident light beam.

It will be appreciated that each mode and wavelength of the multiplexed light beam is spatially separate in the Fourier plane.

The method may comprise transmitting the single multiplexed light beam across an optical channel selected from a group comprising one or more optical fiber/s and free space.

The first optical element may be selected from a group comprising a diffractive optical element, an aspherical optical element, and a phase only spatial light modulator.

The method may comprise encoding the first optical element with a single hologram operable to generate the predetermined modes irrespective of the one or more wavelengths of the incident light beam, wherein the single hologram is a superposition of a plurality of holograms, wherein each of the plurality of holograms has a different carrier frequency corresponding to each of the predetermined number of modes, and wherein each different carrier frequency has a substantially saw-tooth shaped phase function.

The method may comprise:
receiving the single multiplexed light beam;
acting on the received single multiplexed light beam with a second optical element to de-multiplex the received single multiplexed light beam to constituent spatially separate modes in a simultaneous fashion independent of the associated wavelength/s thereof; and
use the de-multiplexed modes as one or both of carrier channels and bits in a bit coding scheme.

The method may comprise complex-amplitude modulating the incident light beam with the second first optical element to de-multiplex the multiplexed light beam in a manner that is mode selective but independent of the wavelength/s of the multiplexed light beam. In other words, the spatial modes may be de-multiplexed irrespective of the one or more wavelengths of the multiplexed beam.

The second optical element may be selected from a group comprising a diffractive optical element, an aspherical optical element, and a phase only spatial light modulator.

The method may comprise encoding the second optical element with a single hologram to de-multiplex the received single multiplexed light beam, wherein the single hologram is a superposition of a plurality of holograms corresponding to the predetermined number of modes, wherein each hologram of the plurality of holograms has a spatial frequency matched to spatially separate a particular mode from the single multiplexed light beam irrespective of the wavelength/s of the multiplexed light beam, wherein each spatial frequency has a substantially saw-tooth shaped phase function.

The method may comprise transmitting the single multiplexed beam from the first optical element to the second optical element.

The method may comprise the step of modal decomposition, wherein modal weightings of the de-multiplexed modes are determined so as to detect a signal for each mode.

The method may comprise one or both the steps of:
adjusting a phase function for each mode to correct for distortions and aberrations; and
applying a linear grating across each mode and use only a first diffraction order thereof for each of the predetermined number of modes.

According to a second aspect of the invention, there is provided a method of optical communication comprising:
receiving at least one incident light beam having one or more wavelengths;
simultaneously creating a predetermined number of spatial modes per one or more wavelengths of the incident light beam in a manner which is independent of the one or more wavelengths of the incident light beam, wherein each of the predetermined number of spatial modes have at least two spatial degrees of freedom;
multiplexing the created modes to create a single multiplexed light beam; and
use the multiplexed light beam for optical communication wherein the spatial modes are used as one or both of carrier channels and bits in a bit coding scheme.

The method may comprise:
creating the predetermined number of spatial modes, each having two degrees of spatial freedom, wherein the two spatial degrees of freedom is two degrees of freedom in spatial pattern; and
applying a phase gradient to each of the spatial modes during creation thereof resulting in a grating; and
use only a first order of diffraction for creating the predetermined number of spatial modes. The method may comprise multiplexing the first order of diffraction to form the multiplexed beam. Applying the phase gradient may comprise applying a linear grating to each mode.

According to a third aspect of the invention, there is provided a method of optical communication comprising:
receiving a single multiplexed light beam comprising a multiplex of a predetermined number of spatial modes per one or more wavelengths, wherein each of the predetermined number of spatial modes per one or more wavelengths have at least two spatial degrees of freedom;

acting on the received single multiplexed light beam with a second optical element to de-multiplex the received single multiplexed light beam to constituent spatially separate spatial modes in a simultaneous fashion and independent of the wavelength/s; and
use the de-multiplexed spatial modes as one or both of carrier channels and bits in a bit coding scheme.

The method may comprise the step of modal decomposition, wherein modal weightings of the de-multiplexed modes are determined so as to detect a signal for each mode.

According to a fourth aspect of the invention, there is provided a method of optical communication comprising:
receiving a single multiplexed light beam comprising a multiplex of a predetermined number of spatial modes per one or more wavelengths, wherein each of the predetermined number of spatial modes per one or more wavelengths have at least two spatial degrees of freedom;
de-multiplexing the received single multiplexed light beam with acting on the received single multiplexed light beam with a second optical element to constituent spatially separate spatial modes in a simultaneous fashion and independent of the wavelength/s; and
use the de-multiplexed spatial modes as one or both of carrier channels and bits in a bit coding scheme.

According to the fifth aspect of the invention, there is provided an optical communication system comprising:
an optical transmitter comprising a first optical element, the optical transmitter being configured to:
  receive at least one incident light beam having one or more wavelengths; and
  act on the incident light beam with the first optical element to create a single multiplexed light beam comprising a multiplex of a predetermined number of modes per one or more of the wavelengths of the incident light beam, in a wavelength independent fashion, wherein each of the predetermined number of modes per one or more wavelengths have at least two spatial degrees of freedom; and
  transmit the multiplexed light beam over one or more optical fibre/s or free space; and
an optical receiver comprising a second optical element, the optical receiver being configured to:
  receive the single multiplexed light beam from the optical transmitter;
  act on the received single multiplexed light beam with the second optical element to de-multiplex the received single multiplexed light beam to constituent spatially separate modes in a simultaneous fashion, independent of wavelength/s of the multiplexed beam; and
  use the de-multiplexed modes as one or both of carrier channels and bits in a bit coding scheme.

The two spatial degrees of freedom of the spatial modes may be two degrees of freedom in spatial pattern and are selected from a group comprising radial and azimuthal indices of Laguerre Gaussian beams, and X and Y axis indices of Hermite-Gaussian beams in Cartesian symmetry.

The incident light beam may be a data carrying light beam from a conventional source.

The first and second optical elements may be configured to apply a complex amplitude modulation code to the incident and multiplexed light beams respectively to multiplex and de-multiplex the same respectively in a manner that is mode selective but independent of the wavelength of the incident light beam.

The system may comprise a lens array disposed between the first and second optical elements configured at least to spatially separate the spatial modes and wavelengths in the Fourier plane.

The system may comprise a detector configured to receive the de-multiplexed modes from the second optical element via a spatial filter and detect a signal associated with each mode by detecting a modulus of modal weighting coefficients found by modal decomposition of the received multiplexed beam.

The first and second optical elements may be selected from a group comprising a diffractive optical element, an aspherical optical element, and a phase only spatial light modulator.

The first and second optical elements may be encoded with a single hologram being a superposition of a plurality of holograms, wherein each of the plurality of holograms has a different carrier or spatial frequency corresponding to the predetermined number of modes to multiplex a light beam with the predetermined modes in the case of the first optical element and de-multiplex a light beam to the predetermined modes in the case of the second optical element in a wavelength independent manner, wherein each carrier frequency has a substantially saw-tooth shaped phase function.

The first and second optical elements may be configured to perform one or both of the steps of:

adjusting a phase function for each mode to correct for distortions and aberrations; and applying a linear grating across each mode and use only a first diffraction order thereof for each of the predetermined number of modes.

The first optical element may be configured to:

create the predetermined number of spatial modes, each having two degrees of spatial freedom, wherein the two spatial degrees of freedom is two degrees of freedom in spatial pattern; and apply a phase gradient to each of the spatial modes during creation thereof resulting in a grating; and use only a first order of diffraction for creating the predetermined number of spatial modes.

According to a sixth aspect of the invention, there is provided a transmitter for optical communication comprising a first optical element, the optical transmitter being configured to:

receive at least one incident light beam having one or more wavelengths; and act on the incident light beam with the first optical element to create a single multiplexed light beam comprising a multiplex of a predetermined number of modes per one or more of the wavelengths of the incident light beam, in a wavelength independent fashion, wherein each of the predetermined number of modes per one or more wavelengths have at least two spatial degrees of freedom; and transmit the multiplexed light beam over one or more optical fibre/s or free space.

According to a seventh aspect of the invention, there is provided an optical receiver for use in an optical communication system, wherein the optical receiver comprises a second optical element, the optical receiver being configured to:

receive a single multiplexed light beam from the optical transmitter, wherein the multiplexed light beam comprises a multiplex of a predetermined number of modes per one or more of the wavelengths, wherein each of the predetermined number of modes per one or more wavelengths have at least two spatial degrees of freedom;

act on the received single multiplexed light beam with the second optical element to de-multiplex the received single multiplexed light beam to constituent spatially separate modes in a simultaneous fashion, independent of wavelength/s of the multiplexed beam; and use the de-multiplexed modes as one or both of carrier channels and bits in a bit coding scheme.

The methods and system as described herein may provide increased bandwidth in optical communication use space division multiplexing by spatial light modulation in two spatial degrees of freedom.

It will be appreciated that the modes may be produced use either amplitude or phase change, or both.

DESCRIPTION OF THE DRAWINGS

In the following description, for purposes of explanation, numerous specific details are set forth in order to provide a thorough understanding of an embodiment of the present disclosure. It will be evident, however, to one skilled in the art that the present disclosure may be practiced without these specific details.

Figure 1:
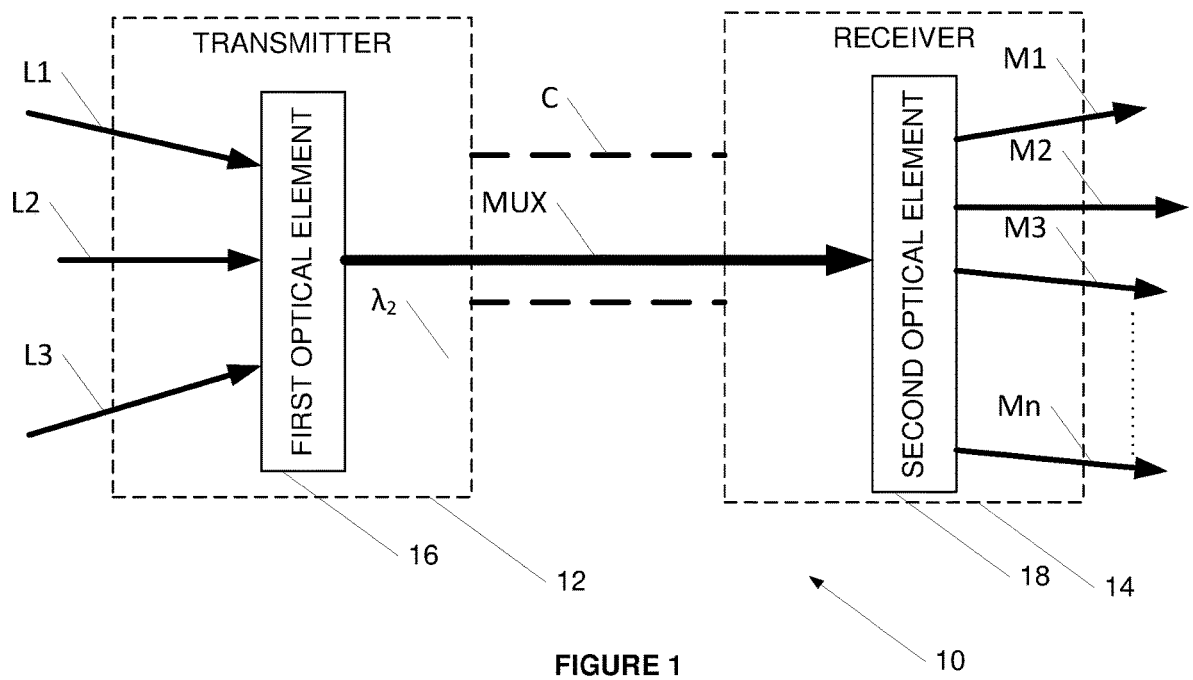
FIG. 1 shows a high level blocked diagram of an optical communications system in accordance with an example embodiment of the invention.

Referring to FIG. 1 of the drawings where a high level block diagram of an optical communication system in accordance with an example embodiment of the invention is generally indicated by reference numeral 10.

The optical communication system 10 comprises a transmitter 14 and a receiver 16 which are configured to communicate data optically via optical communication channel C. The channel C may be free space or one or more multi-mode fibre optic cables. However, for ease of explanation, the system 10 and subsequent examples which follow will be described with reference to the channel C being free space.

The transmitter 14 is typically configured to receive light beams from various conventional optical data sources, for example, beams L1, L2, L3 from conventional laser sources (not shown) used for optical communication having differing wavelengths $\lambda_1$, $\lambda_2$, and $\lambda_3$. In this regard, the transmitter 14 comprises a first optical element 16 configured to receive the beams L1, L2, and L3 and act on them to create a single multiplexed beam MUX composed of a pre-determined number of spatial modes per wavelength $\lambda_1$, $\lambda_2$, and $\lambda_3$, wherein said spatial modes have two degrees of freedom in spatial pattern. As will be discussed below, the first optical element 16 is configured to create the multiplexed beam MUX in a manner which is independent of the wavelengths $\lambda_1$, $\lambda_2$, and $\lambda_3$ of the beams L1 to L3 respectively. In other words, the first optical element 16 is capable of generating the predetermined number of modes irrespective of the wavelengths of the incident beams, particularly for purposes of de-multiplexing as described below.

For ease of illustration, three beams L1 to L3 are provided, however, it will be appreciated that the system 10 may be configured to receive a single beam having a plurality of wavelengths as well as multiple beams each having a single wavelength as the case may be and may operate substantially as described herein. Moreover, the beams L1 to L3 may be conventional data carrying beams carrying data in a conventionally modulated fashion on the respective wavelengths $\lambda_1$, $\lambda_2$, and $\lambda_3$.

In a preferred example embodiment, the modes which make up the MUX beam are Laugeurre Gaussian (LG) modes. The LG modes are solutions of the Helmholtz equation and form a complete orthonormal basis and each beam is characterized by an azimuthal index l and a radial index p as is understood in the field. In cylindrical coordinates, the LG modes are described by:

$$E^{LG}_{(p,l)}(r, \emptyset, z) = \frac{1}{w(z)} \sqrt{\frac{2p!}{\pi(|l|+p)!}} \exp(i(2p+|l|)\Phi(z)) \times \left(\frac{2r^2}{w^2(z)}\right) L_p^{|l|}\left(\frac{r\sqrt{2}}{w(z)}\right)^{|l|} \exp\left(-\frac{ikr^2}{2R(z)} - \frac{-r^2}{w^2(z)} + il\emptyset\right), \quad (1)$$

where $\varphi(z)$ represents the Gouy phase, $w(z)$ is the beam spot size parameter and $R(z)$ is the radius of the beam curvature and $L_p^{|l|}$ are the Laguerre polynomials.

At its waist plane (z=0), Equation (1) may also be described by:

$$LG_{pl}(r, \emptyset) = \sqrt{\frac{2p!}{\pi\omega_0^2(p+|l|)!}} \left(\frac{\sqrt{2}r}{\omega_0}\right)^{|l|} L_p^{|l|}\left(\frac{2r^2}{\omega_0^2}\right) \times \exp\left(-\frac{r^2}{\omega_0^2}\right)\exp(il\emptyset), \quad (2)$$

where p and l are the radial and azimuthal indices respectively, $(r, \varphi)$ are the transverse coordinates, $L_p^{|l|}$ is the generalized Laguerre polynomial and $\omega_0$ is a scalar parameter corresponding to the Gaussian (fundamental mode) radius. The mode size is a function of the indices and is given by:

$$\omega_{pl} = \omega_0\sqrt{2p+|l|+1} \quad (3)$$

Such modes are shape invariant during propagation and are reduced to the special case of the Gaussian beam when p=l=0.

The first optical element 16 is configured to perform complex amplitude modulation on the beams L1, L2, and L3 so as to generate a predetermined number of LG modes for each wavelength $\lambda_1$, $\lambda_2$, and $\lambda_3$ and multiplex them in a single beam MUX which is transmitted over free space channel C in a conventional fashion.

The receiver 14 of the system 10 comprises a second optical element 18 located downstream from the first optical element 16 so as to receive the MUX beam therefrom. The second optical element 18 is configured to de-multiplex the incident MUX beam to recover the predetermined number of modes M1, M2, M3 . . . Mn in a manner which is independent of wavelength/s of the MUX beam. In other words, irrespective of whatever wavelengths that the MUX beam comprises, the second optical element 18 is configured to de-multiplex the same to recover the M1 to Mn for every wavelength in the MUX beam. These recovered modes M1 to Mn are used either as optical channels or bits in a bit encoding and decoding scheme.

As will be discussed below, elements 16 and 18 are typically matched to multiplex and de-multiplex beams, for example, the element 18 may be configured to apply complex conjugate to the MUX beam. The elements 16 and 18 are constructed, inter alia, depending on the number of modes desired and may be in the form of a fabricated optic such as diffractive optical element or a computer controlled apparatus such as a spatial light modulator, particularly a phase only spatial light modulator. For brevity, various optical and electronic components for transmission and processing of the optical data utilized in the system 10 is not illustrated or discussed as these are conventional in the field of invention.

In any event, it will be appreciated that the elements 16 and 18 are encoded with a predetermined number of holograms to be able to multiplex and de-multiplex the predetermined number of modes independent of wavelength. Each hologram on the element 16 is configured to generate one of the predetermined number of modes and similarly each hologram on the element 18 is subsequently configured to extract or detect an associated mode. The holograms may typically be phase holograms and may be multiplexed or superimposed into a single hologram so as to enable the element 16 to simultaneously generate and multiplex multiple modes, and similarly enable the element 18 to detect or de-multiplex multiple modes simultaneously. In one example embodiment, a complex valued function, $T(r)=A(r)\exp(i\Phi(r))$ with $A \in [0,1]$ and $\Phi \in [-\pi, \pi]$ is encoded into a phase hologram $H(r)=\exp(i\psi(r))$ with given unit amplitude transmittance and a certain phase modulation $\psi(A, \Phi)$. When superimposing the holograms, the final hologram becomes $T(r)=\Sigma_{p,l} H(r)\exp(k_{pl} \cdot r)$.

Differently explained, for a hologram of the form $t_n(r)$ which is used to detect an incoming mode, $M_n$ each hologram detects one mode. However, it is necessary for the element 18 to be able to detect all modes in real-time with a single measurement. This is achieved by spatially de-multiplexing the incoming MUX beam, which in turn requires the superposition of all the required holograms for the detection into one single hologram encoded into the second element or optic 18. For example, by encoding a hologram with $t_1$ and $t_2$, modes $M_1$ and $M_2$ may be detected at the same time. But to distinguish the outcome it is necessary to spatially separate the modes which is achieved by giving each hologram its own "direction", or spatial carrier wave, e.g., $t_1(r) \exp(iK_1 \cdot r)$ and $t_2(r) \exp(iK_2 \cdot r)$. In order to generate the single hologram which is used to generate a predetermined number of modes as envisaged herein, a series of single transmission functions $t_n(r)$ are superimposed to produce a final transmission function or hologram described by:

$$T(r)=\Sigma_{n=1}^{N} t_n(r)\exp(iK_n r), \quad (4)$$

wherein N is the maximum number of multiplexed modes.

Each transmission functions $t_n(r)$ is multiplied with a unique carrier frequency $K_n$ such that in the Fourier plane, the carrier frequencies $K_n$ manifest as separate spatial coordinates. This allows multiple LG modes to be generated and subsequently detected simultaneously thus producing a high data transmission rate.

In any event, in order to correct for all aberrations introduced by the spatial carrier and wavelengths, the aberrations are measured and a phase-only correction term, $\phi_n(r)$ is added such that Equation 4 becomes:

$$T(r)=\Sigma t_n(r)\exp(iK_n \cdot r)\exp(i\phi_n(r)) \quad (5)$$

Figure 2:
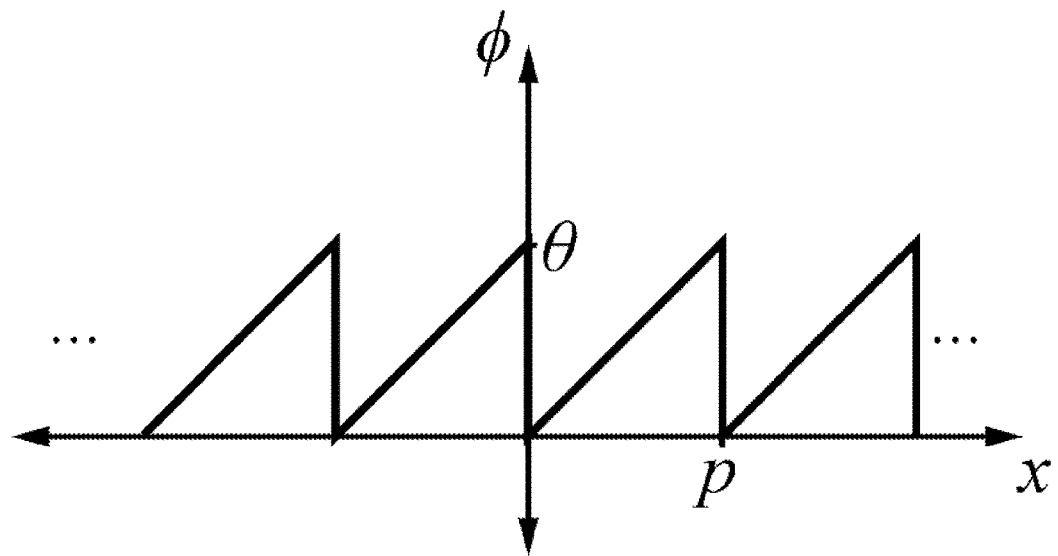
FIG. 2 shows a saw-tooth phase profile of a spatial carrier frequency in accordance with an example embodiment of the invention.

To achieve the wavelength independence as envisaged herein $K_n$ or particularly $K_n \cdot (r)$ is typically in the form of a linear grating, essentially a saw-tooth shaped phase function as illustrated in FIG. 2. It will be appreciated that $K_n \cdot (r)$ could take many forms, but this particular form is preferable. The caveat is that the measurement of the hologram should be performed in the first diffraction order as will be described below.

In particular, in order to design the elements 16, and 18 to achieve wavelength independence, a one-dimensional phase mask function will be considered with the understanding that the same principles apply when working in two dimensions (x & y). Considering a generalized optical field described by:

$$f(x)=|f(x)|\exp(i\phi(x)) \quad (6)$$

which is multiplied by a linear phase gradient $$g(x) = \exp\left(i\frac{2\pi n}{p}x\right)$$

to move the desired field away from the optical center. The linear phase gradient is chosen such that it would have a pitch p when wrapped around $2\pi$. One can write an expression for the product u(x) as, $$u(x) = f(x) \times g(x) = |f(x)|\exp\left(i\left[\phi(x) + \frac{2\pi}{p}x\right]\right) \quad (7)$$

With some algebra one can show that the resulting field after wrapping is:

$$u_{wr}(x) = \sum_{n=-\infty}^{\infty} \text{sinc}(\pi[n - k_d])|f(x)|\exp\left(in\left[\phi(x) + \frac{2\pi}{p}x\right]\right) \quad (8)$$

The resultant equation, Eq. 8, can be re-organised more concisely as:

$$u_{wr}(x) = \sum_{n=-\infty}^{\infty} \text{sinc}(\pi[n - k_d])|f(x)|\exp(in\phi(x))\exp\left(i\frac{2\pi n}{p}x\right) \quad (9)$$

which can be Fourier transformed to find the expression in the spectral domain:

$$U_{wr}(X) = \quad (10)$$
$$2\pi \sum_{n=-\infty}^{\infty} \text{sinc}(\pi[n - k_d]) \times \mathfrak{I}\{|f(x)|\exp(in\phi(x))\} \otimes \delta\left(X - \frac{2\pi n}{p}\right),$$

wherein x & X in the equations (6) to (10) refer to the co-ordinates in the spatial domain (x) ad in the Fourier domain (X).

From Equation 10 it is evident that for each n a function exists, $f(x)=|f(x)|\exp(in\phi(x))$, where its phase is independent of $k_d$. Further, the Fourier transform of this function will be shifted due to the applied phase gradient which results in a grating, by convolution with $$\delta\left(X - \frac{2\pi n}{p}\right),$$

to a spatial position which is dependent on the order n and the pitch p. It is clear that it is possible to separate the different order functions using a simple spatial filter. It can also be seen that $k_d$ will determine the intensity of the diffraction orders according to $\text{sinc}(\pi[n-k_d])$. In other words, the holograms can be executed wavelength-independent if one is prepared to tolerate some intensity loss due to operating off-wavelength.

To illustrate the point, consider the usual case where a spatial filter is used to select only the first diffraction order, i.e., n=1, and Eq. (4) is substituted into Equation 10 with A1=$\text{sinc}(\pi[n-k_d])$, $$U_{wr}(X)|_{n=1} = 2\pi A_1 \mathfrak{I}\{|f(x)|\exp(i\phi(x))\} \otimes \delta\left(X - \frac{2\pi}{p}\right) \quad (11)$$
$$= 2\pi A_1 F\left(X - \frac{2\pi}{p}\right)$$

The result is the Fourier transform of the desired (ideal) function, but spatially shifted. It can be seen that in the first diffraction order of a blazed grating one has the desired phase function but the overall transmission intensity has changed through the factor A1.

It will be appreciated that the explanation of the holograms herein apply equally to the elements 16 and 18 as both are encoded with holograms designed in the fashion described herein. However, as mentioned above, in some example embodiments, the elements 16 and 18 are encoded with matched complementary holograms which, in the case of the element 16, multiplexes a plurality of modes in a wavelength independent fashion, and in the case of element 18 de-multiplexes a plurality of modes in a wavelength independent fashion. However, it will be understood that in example embodiments of system 10, wherein only element 16 or 18 is employed, the holograms encoded into the elements 16 and 18 need not be matched to a respective element 18 or 16 as the case may be.

Though not illustrated, the receiver 14 may comprise a suitable detector, etc. such that the receiver 14 is configured to perform modal decomposition after the step of spatial de-multiplexing, i.e., finding the modal weightings as will be described below.

Figure 3:
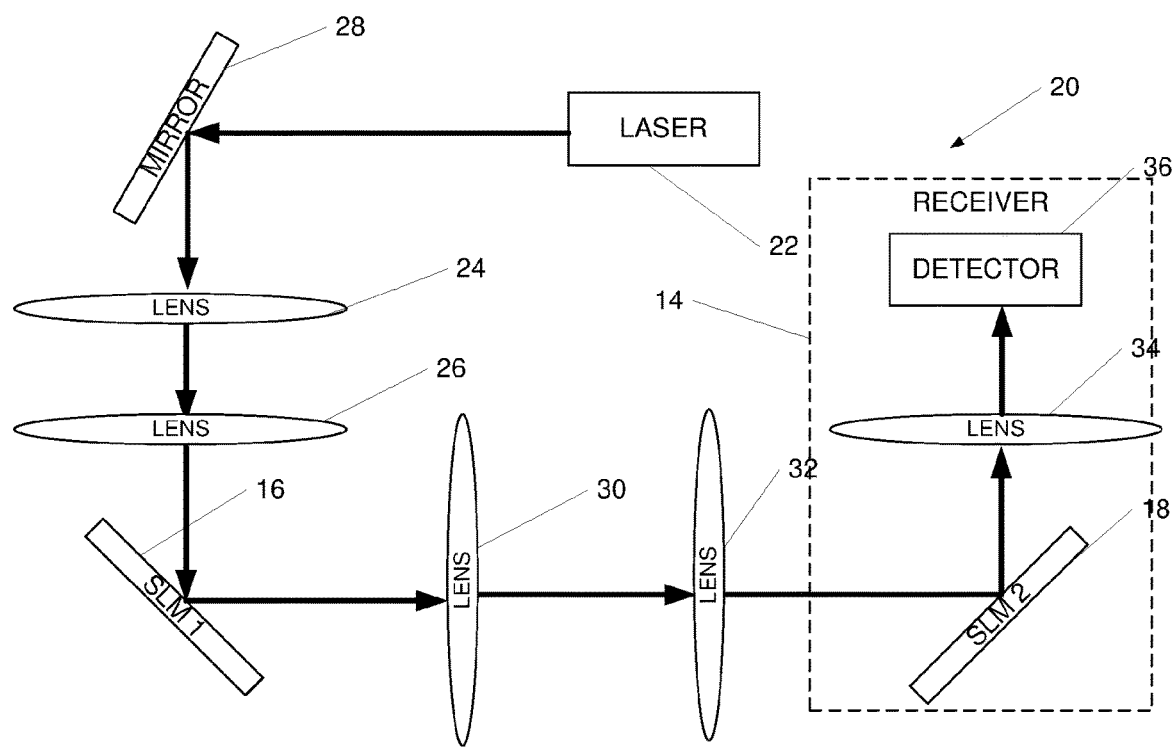
FIG. 3 shows a block diagram of an experimental setup of an optical communication system in accordance with an example embodiment of the invention.

As alluded to above, the system 10, particularly the elements 16 and 18, may be realized in a number of different ways and one way is illustrated in FIG. 3 of the drawings where an experimental setup of the system 10 is illustrated in more detail and is generally indicated by reference numeral 20. It will be understood that the setup 20 as well as the description which follows may be considered as an expansion of the high level description of the system 10 above and thus similar parts will be referred to by the same reference numerals. Moreover, the experimental setup 20 may be expanded into a real-world application using the principles described herein.

The experimental setup 20 comprises a source of a beam of light in the form of a laser 22. The laser 22 is a continuum linearly-polarized Argon Ion laser (Laser Physics: 457-514 nm) but may be a HeNe laser, etc. The beam output of the laser 22 is expanded and collimated by a telescope comprising lenses 24 and 26 to approximate a plane wave via a mirror 30. Lenses 24 and 26 have focal lengths of f1=50 mm and f2=300 mm, respectfully. The laser 22 is a wide range multi-line laser 22 which, for the purposes of the experimental setup 20, is decomposed into three wavelength components $\lambda_1$=457 nm, $\lambda_2$=488 nm and $\lambda_3$=514 nm by way of a grating. The beams of wavelengths $\lambda_1$, $\lambda_2$, and $\lambda_3$ typically propagate in parallel to each other.

The setup 20 further comprises first and second optical elements 16 and 18 in the form of spatial light modulators (SLMs) 16 and 18, for example, phase only spatial light modulators having 1080×1920 pixels with a resolution of 8 µm per pixel. The SLMs 16 are typically configured to generate a full set of modes using complex amplitude modulation. In particular, the SLMs 16, 18 are configured to be addressed by computer generated holograms (CGH), particularly a single hologram each to multiplex and de-multiplex the modes as described above. Though not illustrated, it will be appreciated that the SLMs 16, 18 are computer controlled devices capable of providing computer generated holograms to generate the modes as described herein. In the experimental setup 30, a screens of the SLMs 16 and 18 are typically split into three independent screens, wherein each screen is controlled independently, particularly to be addressed by the holograms.

The setup 20 comprises a 4f configuration system to project the multiplexed beam from SLM 16 to SLM 18. In particular, the setup 20 comprises lenses 30 and 32 with focal lengths of f3=150 mm and f4=200 mm. Moreover, the setup 20 comprises a lens 34 disposed between the SLM 18 and a detector 36 in the form of a CCD (Charge Coupled Device) camera, for example a 1280×960 pixel CCD camera. It will be understood that the de-multiplexed beam may be projected to the CCD 36 via 2f system.

Figure 4:
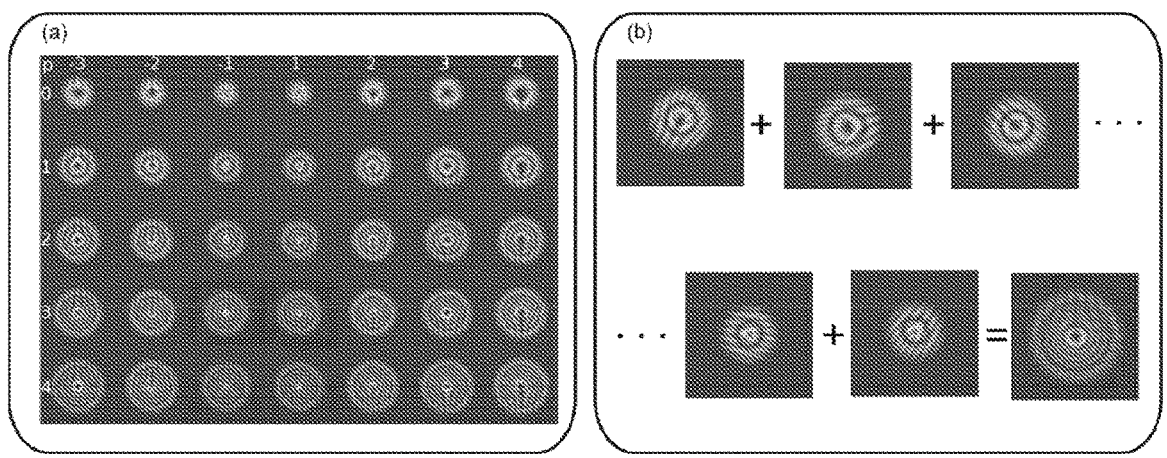
FIG. 4(a) shows an illustration of example holograms encoded via a complex amplitude modulation to generate different $LG_{pl}$ modes in accordance with an example embodiment of the invention.
FIG. 4(b) shows an illustration of example holograms encoded with different carrier frequencies superimposed into a single hologram to produce a special separation of all modes in the Fourier plane in accordance with an example embodiment of the invention.

In an experimental approach with the setup of FIG. 3 a mixed radial and azimuthal mode set of 35 $LG_{pl}$ modes was generated by combination of p={0; 1; 2; 3; 4} and l={−3,−2,−1, 1, 2, 3, 4}. These modes were arbitrarily selected and, as such, do not exclude other combinations. The amplitude and phase of the $LG_{pl}$ modes set (Equation 2) was encoded into phase-only digital holograms and displayed on the SLMs 16 and 18 so as to generate the desired $LG_{pl}$ modes. FIG. 4(a) shows the 35 generated holograms (encoded via complex amplitude modulation) to create the desired subset of $LG_{pl}$ modes. Their corresponding theoretical intensity profiles can be seen in FIG. 5 (a). In accordance with the invention, these holograms were multiplexed or superimposed into a single hologram, with different carrier frequencies as illustrated In FIG. 4(b).

Experimentally, the three beams of the laser 22 are directed to the three independently controlled screens of SLM 16. Each of the screens of the SLM 16 was addressed with the multiplexed hologram representing the 35 desired $LG_{pl}$ modes as can be seen in FIG. 6(a). As described above, the modes are encoded via complex amplitude modulation and only the first diffracted order from the SLM 16 is used.

At the receiver 14, information decoding is performed using modal decomposition, for this, the beams are projected onto the SLM 18 via the 4f configuration system. It will be appreciated that in the experimental setup 20, the SLM 18 is also split into three independent screens, each of which is addressed with a multiplexed hologram. The hologram on SLM 18 consists of a complex conjugate of all the 35 modes, encoded with different spatial carrier frequencies as illustrated in FIG. 6(b) to de-multiplex the incident multiplexed beam.

In one example embodiment, with reference to Equation 1, the de-multiplexing hologram may be given mathematically by:

$$t_{DEMUX} = \Sigma E_{(p,l)} LG(r,\phi,z), \quad (12)$$

which consists of a superposition of all the protocol modes.

It will be appreciated that, at the receiver 14, a wavelength independent multimode correlation filter is implemented on the SLM 18 so as to identify with high fidelity any of the 105 $LG_{pl}$ modes in a single real-time measurement.

Figure 5:
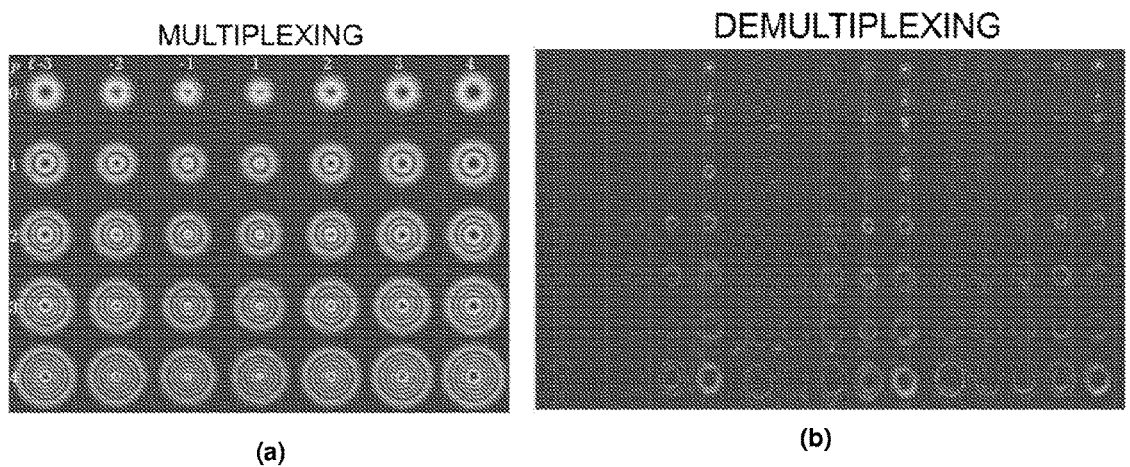
FIG. 5(a) shows intensity profiles of $LG_{pl}$ modes in accordance with an example embodiment of the invention.
FIG. 5(b) shows an illustration of a de-multiplexed set of modes identified in the far field using a CCD camera and a lens in accordance with an example embodiment of the invention.

In order to identify each mode, the on-axis intensity of the projection in the far field is measured. For this the CCD camera 36 with the 2f configuration as described above is used. In the detection plane, all 105 modes appear spatially separated due to the unique carrier frequencies $K_n$, as described above, in a rectangular configuration as can be seen in FIG. 5(*b*). In this way an incoming mode may be unambiguously identified by detecting on-axis high intensity for many other modes, the one that matches the incoming one, is always brighter.

In the experimental setup, it was necessary to compensate for small spherical aberrations and this is typically achieved by digitally encoding a cylindrical lens on the SLM 18 which corrects for all modes.

In particular, it will be appreciated that to make the detection, the input field, which may be denoted as V(r), is decomposed into modes $U_n(r)$, such that $V(r)=\Sigma_n a_n U_n(r)$. To detect the signal of each mode one must be able to detect the modulus of the modal weighting coefficients $a_n$. This can be found by modal decomposition using the inner product of the incident field with a match filter: $|<U_n|V>|=|a_n|$. It will be appreciated that optically, the inner product is performed by directing the incident beam onto a match filter and viewing the Fourier transform, with the use of a lens on a CCD camera 36.

In one approach, the resultant signal at the detector 36 can be numerically calculated as:

$$I = F(E_{(p,l)}^{LG}(r,\phi)) \otimes F(t_{DEMUX}) \quad (13)$$

where I refers to the output signal and F represents the Fourier transform. $\otimes$ denotes the convolution process and $E_{(p,l)}^{LG}(r,\phi,z)$ is the LG mode previously defined in Equation 1. Equation x can then be expressed as:

$$I = \frac{\exp(i2kf)}{i\lambda f} \int_0^\infty \int_0^{2\pi} t_{DEMUX} E_{(p,l)}^{LG}(r, \emptyset, z) r dr d\Phi, \quad (14)$$

where f is the focal length of the lens used in the modal decomposition, $\lambda$ is the wavelength and k is the wavenumber. The mode corresponds to a bright spot at the centre of the output detector 36. If there is a mismatch between the incoming mode and the mode in the detector 36, the central spot will itself become a small ring with a low intensity in the centre, which will cause a negligible signal on the detector. It will be noted that each mode has a pre-defined position on the detector.

Figure 6:
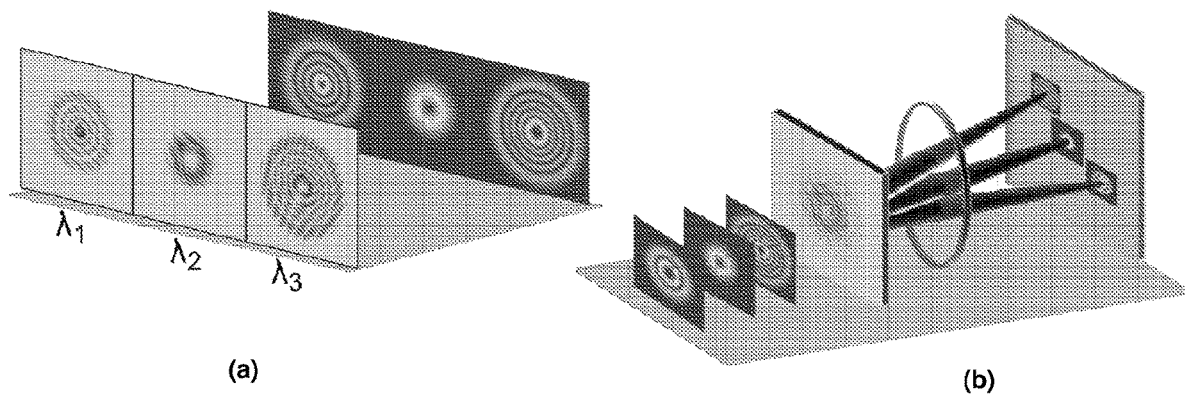
FIG. 6(a) shows an illustration of an SLM split into three independent screens and addressed with holograms to produce the set of modes shown in FIG. 5(a) in accordance with an example embodiment of the invention.
FIG. 6(b) shows an illustration of a modal filter in accordance with the invention consisting of positions of all holograms encoded in the SLM in accordance with an example embodiment of the invention.

Using the experimental setup 20 as described above, experimental approaches were undertaken to use the experimentally generated $LG_{pl}$ modes to encode and decode information in the multiplexing and de-multiplexing schemes illustrated in FIGS. 5 and 6 over free space.

The information to be transmitted from the transmitter 12 to the receiver over free space was gray-scale images, and colour images. In this regard, the information encoding using the setup 20 was performed in three different ways. In the first one, applied to grayscale images, a particular mode and a particular wavelength is specifically assigned to the gray-level of each pixel forming the image.

Figure 7:
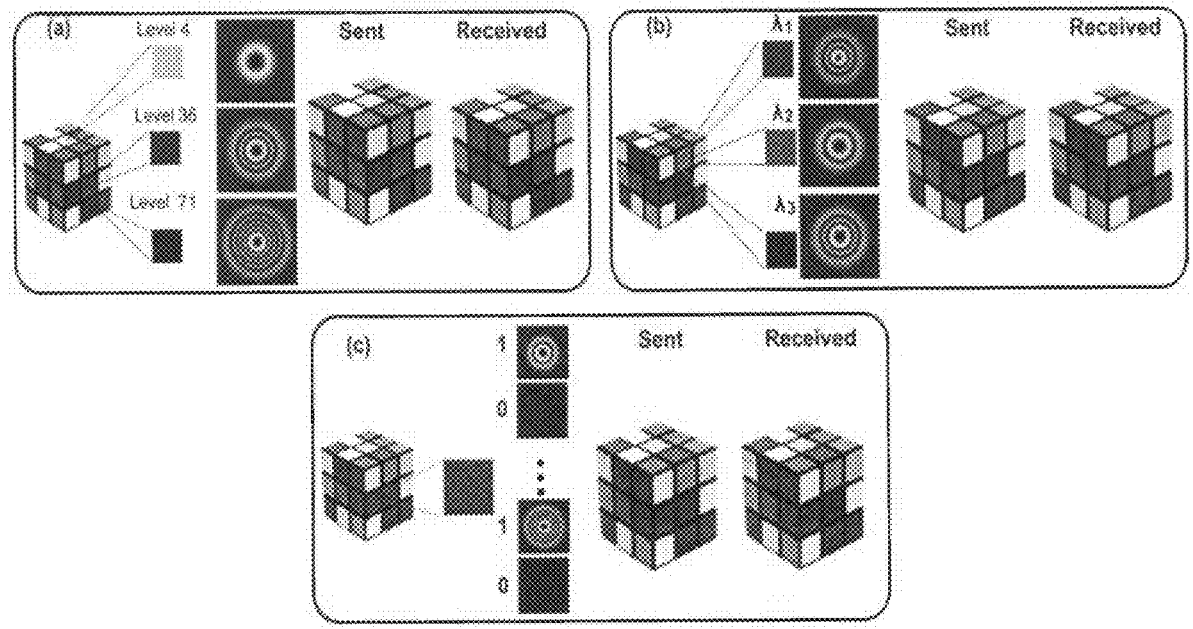
FIG. 7(a) shows an illustration of a single colour channel encoding, as applied to grey scale images in accordance with the invention.
FIG. 7(b) shows illustration of RGB encoding applied to colour images in accordance with an example embodiment of the invention.
FIG. 7(c) shows an illustration indicating a multi-bit encoding, applied to both grey scale and colour images.

For example, the mode $LG_{0-3}$ generated with $\lambda_1$ is assigned to the lowest gray-level and the mode $LG_{44}$ generated with $\lambda_3$ to the highest, see FIG. 7(*a*). In this approach 105 different levels of gray were reached.

In a second approach, applied to colour images, each pixel was first decomposed into its three colour components (red, blue and green). The level of saturation of each colour was assigned to one of the 35 different spatial modes and to a specific wavelength $\lambda_1$, $\lambda_2$ or $\lambda_3$, see FIG. 7(*b*). In this approach only 35 levels of saturation could be reached with a total number of 105 generated modes.

Figure 8:
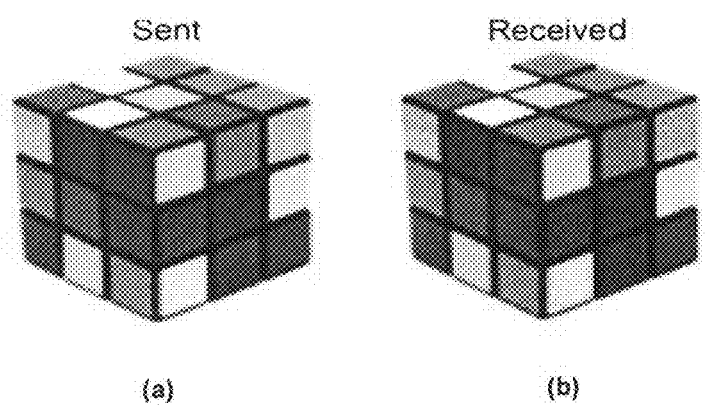
FIG. 8(a-b) shows an experimental example of a sent and received image in accordance with an example embodiment of the invention.

Finally, in the third approach, multi-bit encoding was implemented, see FIG. 7(*c*). In this scheme, 256 levels of contrast were achieved by multiplexing eight different modes on a single hologram. Each of the 256 possible permutations, of these 8 modes, representing a particular gray level. Upon arrival to the detector 36, each permutation was uniquely identified and the information decoded to its 8-bit form to reconstruct the image. This approach was extended to high contrast colour images by using a particular wavelength for each primary colour intensity, achieving a total transmission rate of 24 bits per pixel. The transmission error rate, defined as the ratio between the number of wrong pixels and the total number of transmitted pixels, was found very low and did not reach 1% in the case of gray-scale images. The reliability of this technique was further tested by transmitting different complex images containing all levels of saturation in each RGB component which is shown in FIG. 8 and thus evinces the very high similitude between the original and recovered images.

Figure 9:
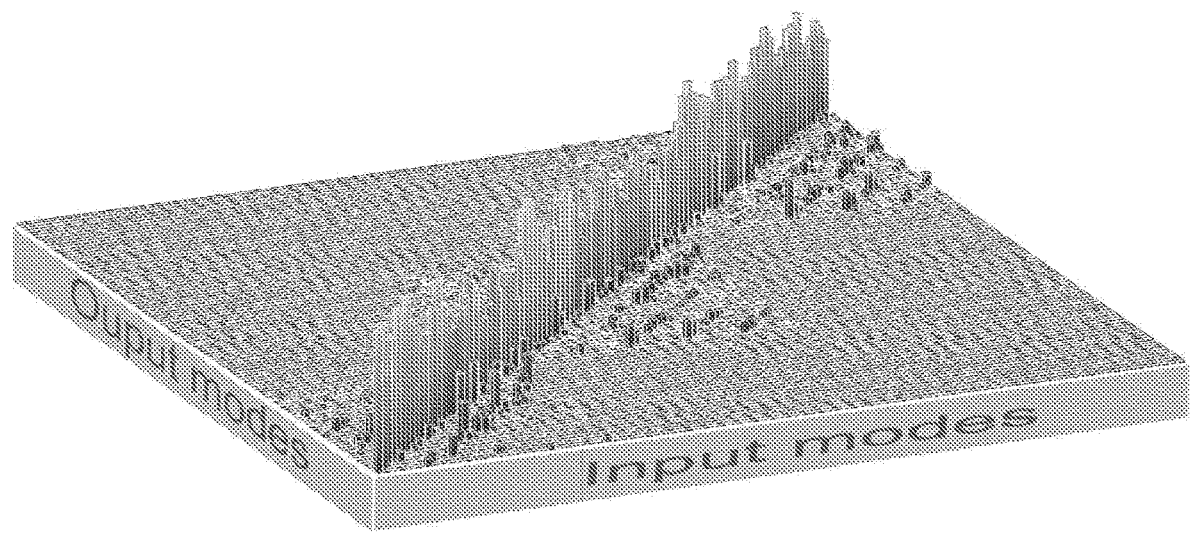
FIG. 9 shows a graphic illustrating cross talk for 105 output modes.

It will be appreciated that intermodal crosstalk for the chosen modes, this is, the crosstalk between the input modes and the measured modes (output modes) is illustrated in FIG. 9. As can be seen, the crosstalk between the different modes is very low and is independent of the p value. In all cases the input mode is detected with very high accuracy, higher than 98%.

Since the encoding technique employed for creating the holograms described above requires that the amplitude of the field be normalized to unity, energy conservation is violated in the generated modes. To compensate for this power scaling, a correction parameter is introduced for each transmission function. The correction parameter, $\alpha_n$, is calculated as the ratio between the encoded optical field $\tilde{\Psi}_n(r)$ and the mode field $\Psi_n(r)$, where $\alpha_n = \max\{|\Psi_n(r)|\}^{-1}$ and $\alpha_n \in \mathfrak{R}^+$. In the case of the measurement procedure (i.e. performing the modal decomposition) the inner product can now be expressed as $$\langle \tilde{\Psi}_n | \tilde{\Psi}_m \rangle = \langle \alpha_n \Psi_n | \alpha_m \Psi_m \rangle = \alpha_n \alpha_m \delta_{nm} \quad (15)$$

where the correction coefficients are determined as a special case of equation $$\alpha_n^2 = \langle \tilde{\Psi}_n | \tilde{\Psi}_n \rangle \quad (16)$$

From the detection signal (i.e. the measured on-axis intensity, $I_n(r)$), the correction coefficients may be applied through the following relationship to normalise the signal to unit power:

$$I_n(r) = \frac{\tilde{I}_n(r)}{\alpha_n^2} \quad (17)$$

Figure 10:
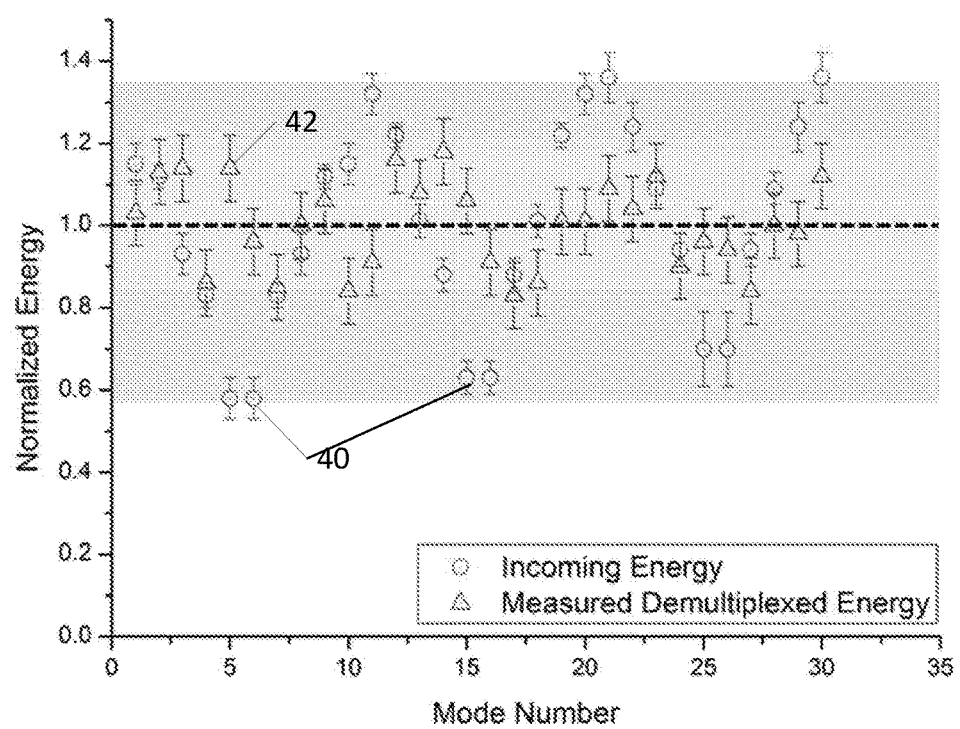
FIG. 10 shows a graph indicating normalisation of detected signals, particularly a plot of the ratio of the energy in the generated modes with energy in the detected signals as a function of selected LG modes.

The normalization is illustrated in FIG. 10 where the ratio between the energy of the generated mode and the energy of the de-multiplexed signal is plotted for the various LG modes being used. The red data points 40 contain the un-normalised measured signals illustrating a wider spread from unity (marked by the dotted line), while the blue data points 42 contain the normalised signals which have a narrower spread.

Figure 11:
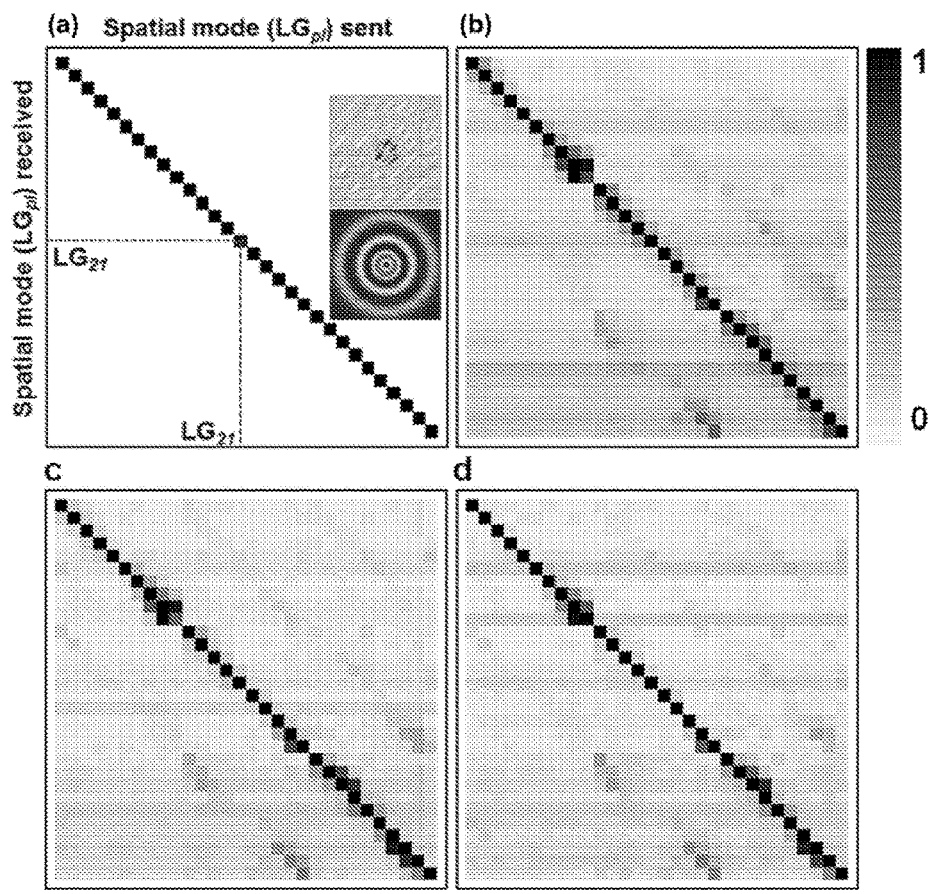
FIG. 11(a-d) shows plots of relative fractions of intensity at de-multiplexed detector positions for selected LG modes so as to indicate the effects of aperture size in the detection plane.

The effect of the aperture size in the detection plane when performing a modal decomposition on the incoming modes was also investigated. The selected LG modes (used as information carriers) were generated on SLM 16 and decomposed via an inner-product measurement at SLM 18 (as depicted in FIGS. 5 and 6). The measurement results are presented in FIG. 11 which illustrates: (a) expected and measured cross-talk between neighbouring modes for a detection aperture size of (b) 24 μm (c) 9.6 μm and (d) 4.8 μm. In all cases ((b)-(d)) the strong diagonal and weak off-diagonal terms imply a highly accurate and precise measurement system which is unaffected by the size of the detection aperture.

Figure 12:
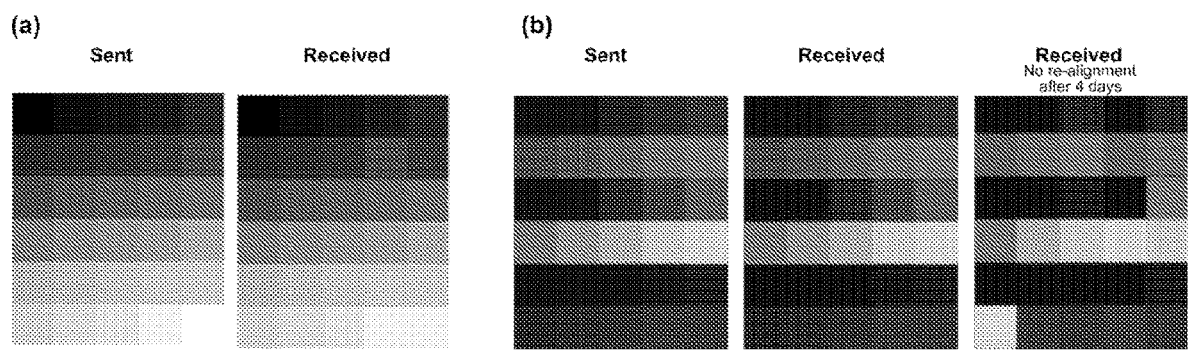
FIG. 12 (a-b) shows illustrations of sent and received test images for a grey scaled test and for verifying the success of the RGB encoding protocol.

The concept of assigning colour values present in a 2D image (as depicted in FIGS. 7(*a*) and (*b*)) was initially tested with a simple image such as those in FIGS. 12(*a*) and (*b*). This test required ensuring that the detector 36 positions were aligned correctly with the on-axis de-multiplexed signals. Incorrect alignment would result in incorrect colour values being decoded. The initial test images contain either 30 different gray-levels (FIG. 12(*a*)) or RGB-values (FIG. 12(*b*)). In both cases it was evident that the reconstructed images are in very good agreement with the sent images illustrating the correct alignment of the demultiplex signals with the static detector positions. The third image of FIG. 12(*b*) contains a reconstructed image acquired four days after the system was initially aligned, illustrating its robustness and versatility.

Figure 13:
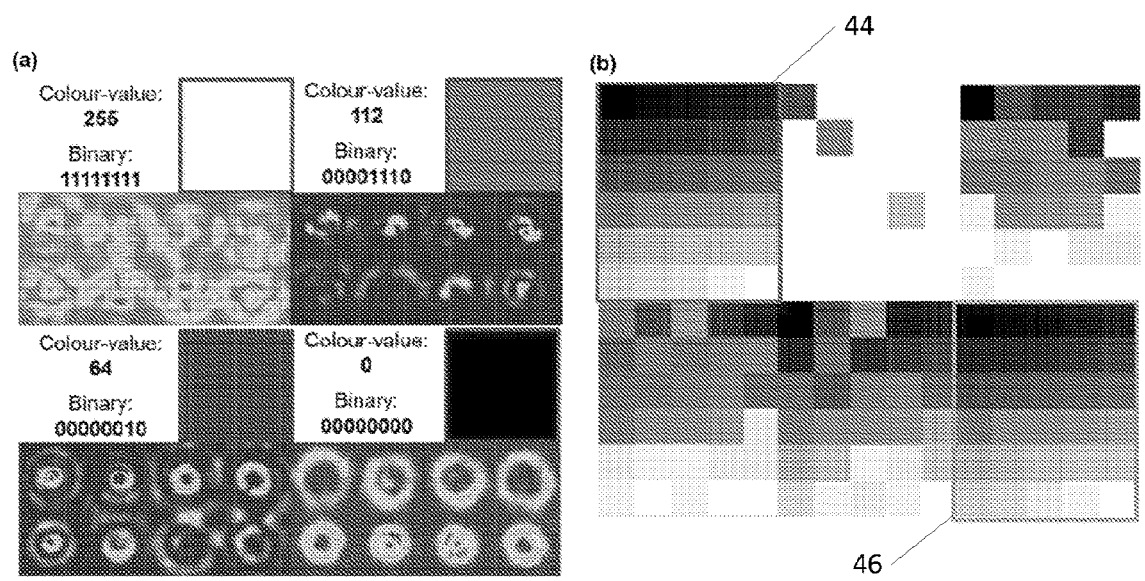
FIG. 13(a-b) shows an illustration of threshold tests for an 8-bit encoding scheme.

In the gray-scale and RGB schemes the user is only concerned with detecting 1 signal out of a possible 35. However, the 8-bit scheme involves detecting 256 unique combinations of either no signal incremented in unit steps up to all possible 8 signals. Since the on-axis intensity is higher for a single signal as opposed to all 8 signals being present (demonstrated in FIG. 13(*a*)), the user needs to carefully select the range of thresholds for the measured intensities. The impact the intensity threshold on the encoding scheme in accordance with the invention was investigated the findings are presented in FIG. 13(*b*). The red border 44 marks the sent image and the green border 46 the successfully reconstructed image obtained at a suitable threshold. The images in between denote the reconstructed images when the threshold was initially set too low illustrating either extreme or mild cross-talk with neighbouring gray-values. Most of the cross-talk occurs with the white colour-value because when the threshold is set too low, the detectors 36 detect noise—often resulting in 8 signals being detected which is the mark of the white colour-value (FIG. 13(*a*)).

Figure 14:
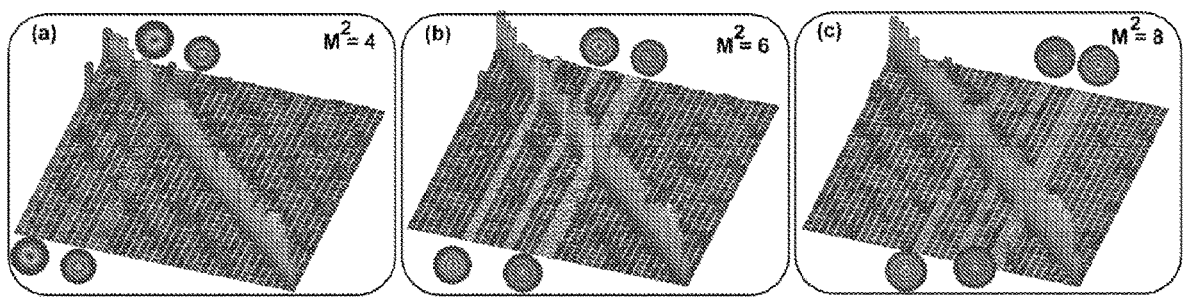
FIG. 14(a-c) shows crosstalk tables for each wavelength showing the modes that share the same quality beam factors for various wavelengths.

Through the beam quality factor $M^2$, as will be discussed below, the LG modes that will propagate in an identical manner may be identified. FIG. 14 shows the cross-talk table for each of the wavelengths used in the aforementioned experiment, in each table, some examples of the beams characterized by the same $M^2$ factor are highlighted. FIG. 14(*a*) corresponds to $\lambda_1 = 457$ nm, here the lines in red 48 show four modes $LG_{0-3}$, $LG_{11}$, $LG_{03}$ and $LG_{1-1}$, that share the mode index, $M^2 = 4$. In FIG. 14(*b*) the modes corresponding to $\lambda_2 = 488$ and $M^2 = 6$ have been highlighted in green 50 which are $LG_{1-3}$, $LG_{2-1}$, $LG_{13}$, and $LG_{21}$. As a final example, FIG. 14 (*c*) shows the cross-talk table for $\lambda_3 = 514$ nm, highlighted in orange 52 the modes with $M^2 = 8$. This is, $LG_{3-1}$, $LG_{23}$, $LG_{31}$, and $LG_{2-3}$.

From the above experiment, it is shown that propagation dynamics (beam size, divergence, phase shift etc.) in free space are entirely governed by the beam quality factor:

$$M^2 = 2p + |l| + 1, \quad (18)$$

with analogous relations for fibre modes.

The $M^2$ may be viewed as a mode index: modes with the same index (e.g., p=0, l=2 and p=1, l=0) will propagate in an identical manner (and experience the same diffraction) regardless of the radial component p as they have the same space-bandwidth product.

From the above, one mode set is as good as any other (at least in terms of perturbation-free communication), provided that the elements are orthogonal and regardless of whether it carries OAM or not. To demonstrate this a mixed radial and azimuthal mode set from the $LG_{pl}$ basis (with p={0, 1, 2, 3, 4} and l={−3, −2, −1, 1, 2, 3, 4} was used to transfer information over free space. Moreover, by implementing MDM on different wavelengths, it was demonstrated that it is possible to expand the overall transmission capacity by several orders of magnitude. The number of carrier channels would be given by the number of optical modes times the number of wavelengths. In the present experiment using the setup 20, 35 optical modes were generated and combined with 3 different wavelengths, creating a basis set of 105 modes. These modes are used as information carriers in a proof-of-concept free space link, capable of transmitting and recovering information in real time with very high fidelity. FIG. 8 is an example of the many images transmitted using the setup 20 over free space. Each image is sent pixel by pixel, for this, the information of colour saturation of each pixel, is encoded using the aforementioned mode set.

The versatility of SLMs, capable of operating in a wide range of the spectrum as well as with broad band sources, allowed customized digital holograms to be generated to encode and decode the information. Furthermore, the designed correlation filters are wavelength insensitive which allows the technique to operate in a large spectrum, compared to existing mode (de) multiplexers which are extremely wavelength sensitive, such as the photonic lantern.

Figures 15, 16:
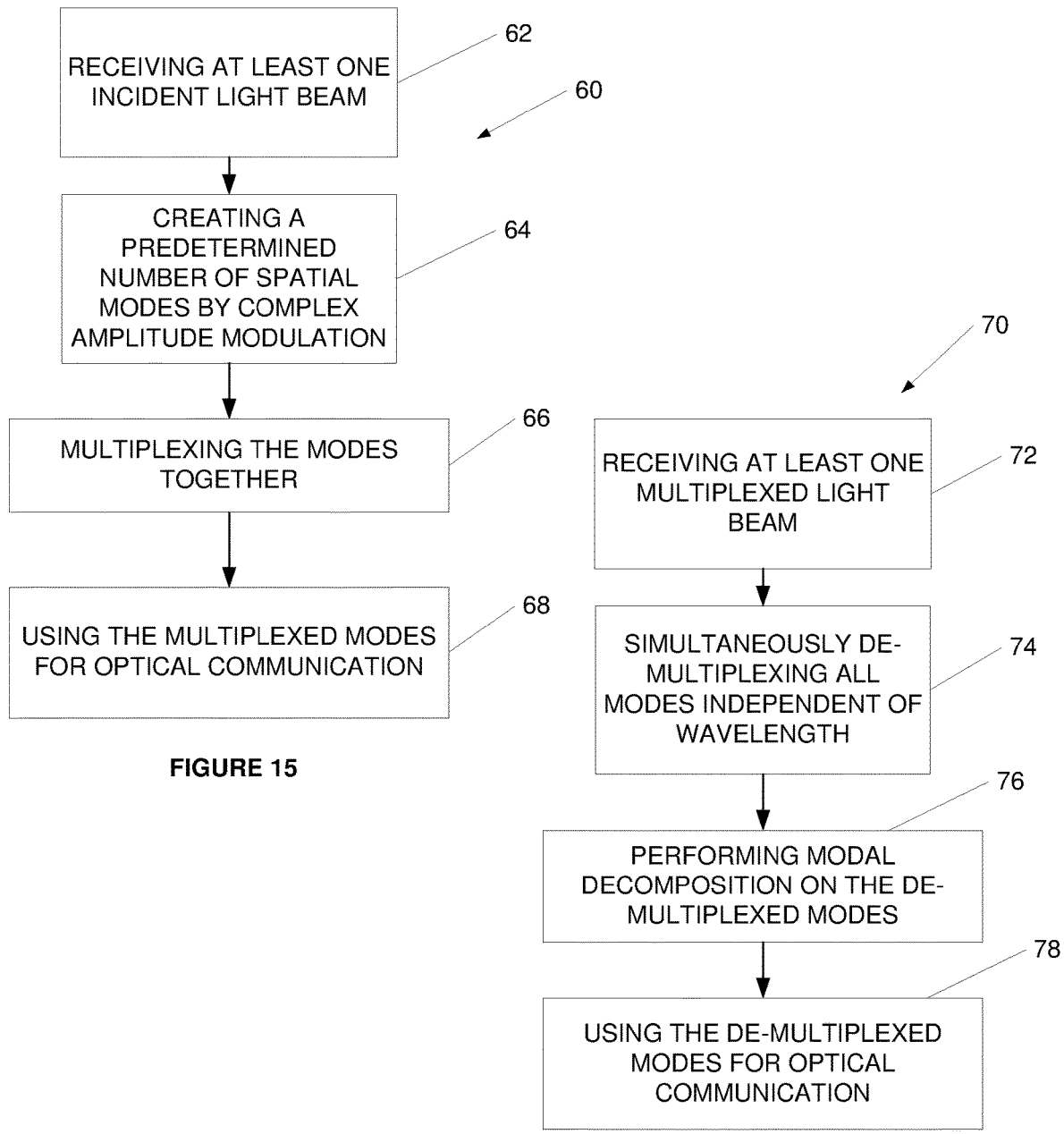
FIG. 15 shows a high level flow diagram of a method in accordance with an example embodiment of the invention.
FIG. 16 shows another high level flow diagram of another method in accordance with an example embodiment of the invention.

The invention will now further be described with reference to FIGS. 15 and 16 of the drawings. FIGS. 15 and 16 illustrate flow/line diagrams of example methods in accordance with the invention and though described with reference to the system 10 and setup 20, as the case may be, it will be appreciated that the methodology as described herein may find application in or with other systems, not illustrated as well.

Referring to FIG. 15 of the drawings a flow diagram of a method of optical communication is generally indicated by reference numeral 60.

The method 60 typically comprises receiving a light beam, block 62, comprising information in one or more wavelengths and creating, at block 64, by way of the first optical element 16, a predetermined number of spatial modes, having two spatial degrees of freedom, via complex amplitude modulation as described hereinbefore described in a manner which is independent of the one or more wavelengths. It will be appreciated that the step of block 64 may be simultaneously performed in response to the light beam being incident on the element 16. Though not illustrated, the step of block 64 may also comprise the step of adjusting the phase function for each mode to correct for distortions and aberrations, and applying a linear grating across each mode, as well as working in the first diffraction order, to generate the modes.

The method 60 then comprises the step of multiplexing all the created modes to a single multiplexed beam (MUX beam), block 66, for use in optical communication, block 68. Though not illustrated, the method 60 may comprise transmitting the multiplexed beam over free space or an optical fibre to a suitable receiver 14.

In a preferred example embodiment, the element 16 is typically a fabricated optic encoded with a hologram, being the superposition of a plurality of holograms, as described above, to simultaneously perform the steps 64 and 66 in a wavelength independent manner. In this way, the element 16 may be conveniently used in conventional optical communication systems, for example, of the type that makes use of WDM to increase the bandwidth thereof.

Referring now to FIG. 16 of the drawings where an optical communication method in accordance with an example embodiment of the invention is generally indicated by reference numeral 70.

The method 70 comprises receiving a multiplexed beam, block 72, typically of the type generated in the method 60, wherein the MUX beam comprises a plurality of spatial modes over a plurality of wavelengths.

The method 70 comprises simultaneously de-multiplexing, block 74, the received MUX beam with the second optical element 18 irrespective of the wavelengths associated therewith to retrieve all the spatial modes M1 . . . Mn (FIG. 1). This independence of wavelength in de-multiplexing the MUX beam conveniently allows for the increase in bandwidth as well as allowing for the method to be used in conventional optical communication systems.

The method 70 then comprises performing modal decomposition, block 76, on the de-multiplexed modes in fashion as described above so as to detect the signal of each mode so as to use the same for optical communication, block 78.

Similarly to the element 16, in a preferred example embodiment, the element 18 is typically a fabricated optic encoded with a hologram, being the superposition of a plurality of holograms, as described above, to simultaneously perform the steps 64 and 66 in a wavelength independent manner. In this way, the element 18 may be conveniently used in conventional optical communication systems, for example, of the type that makes use of WDM to increase the bandwidth thereof.

The approach described herein may be extended to a wider range of wavelengths and to a higher number of modes. The use of polarization could be potentially an additional degree of freedom and could possibly double the overall transmission capacity of the system. Even though here the modes were used as information carriers, the experiment described above establishes the basis for this technique to be incorporated into standard communication systems. In this case each mode would represent a channel that can be modulated and detected with conventional technology. In this way, bandwidth of optical communication systems may be increased.

The invention claimed is:

1. A method of optical communication, wherein the method comprises:
   receiving at least one incident light beam having one or more wavelengths;
   acting on the received at least one incident light beam with a first optical element to create a single multiplexed light beam comprising a multiplex of a predetermined number of spatial modes per one or more wavelengths of the received at least one incident light beam in a manner which is independent of the one or more wavelengths of the received at least one incident light beam, wherein each of the predetermined number of spatial modes have at least two spatial degrees of freedom; and
   using the single multiplexed light beam for optical communication wherein the predetermined number of spatial modes are used as one or both of carrier channels and bits in a bit coding scheme, wherein the first optical element comprises a single hologram operable to generate the predetermined number of spatial modes irrespective of the one or more wavelengths of the received at least one incident light beam, wherein the single hologram is a superposition of a plurality of holograms, wherein each of the plurality of holograms has a different carrier frequency corresponding to each of the predetermined number of modes, and wherein each different carrier frequency has a substantially saw-tooth shaped phase function.

2. The method as claimed in claim 1, wherein the method comprises acting on the single multiplexed light beam with the first optical element to:
   create the predetermined number of spatial modes, each having two degrees of spatial freedom, wherein the two spatial degrees of freedom is two degrees of freedom in spatial pattern; and
   apply a phase gradient to each of the spatial modes during creation thereof resulting in a grating; and
   use only a first order of diffraction for creating the predetermined number of spatial modes.

3. The method as claimed in claim 1, further comprising selecting the two spatial degrees of freedom from a group comprising radial and azimuthal indices of Laguerre Gaussian beams, and X and Y axis indices of Hermite-Gaussian beams in Cartesian symmetry.

4. The method as claimed in claim 1, further comprising receiving the at least one incident light beam in the form of a data carrying light beam.

5. The method as claimed in claim 1, further comprising complex-amplitude modulating the received at least one incident light beam with the first optical element to create the single multiplexed light beam in a manner that is mode selective but independent of the wavelength of the received at least one incident light beam.

6. The method as claimed in claim 1, wherein each mode and wavelength of the single multiplexed light beam is spatially separate in the Fourier plane.

7. The method as claimed in claim 1, further comprising transmitting the single multiplexed light beam across an optical channel selected from a group comprising one or more optical fiber/s and free space.

8. The method as claimed in claim 1, wherein the first optical element is selected from a group consisting of a diffractive optical element, an aspherical optical element, and a phase only spatial light modulator.

9. The method as claimed in claim 1, further comprising:
   receiving the single multiplexed light beam;
   acting on the received single multiplexed light beam with a second optical element to de-multiplex the received single multiplexed light beam to constituent spatially separate modes in a simultaneous fashion independent of the associated wavelength(s) thereof; and
   using the de-multiplexed modes as one or both of carrier channels and bits in a bit coding scheme.

10. The method as claimed in claim 9, further comprising complex-amplitude modulating the received at least one incident light beam with the second first optical element to de-multiplex the single multiplexed light beam in a manner that is mode selective but independent of the wavelength(s) of the single multiplexed light beam.

11. The method as claimed in claim 9, wherein the second optical element is selected from a group consisting of a diffractive optical element, an aspherical optical element, and a phase only spatial light modulator.

12. The method as claimed in claim 9, wherein the second optical element comprises a single hologram to de-multiplex the received single multiplexed light beam, wherein the single hologram is a superposition of a plurality of holograms corresponding to the predetermined number of modes, wherein each hologram of the plurality of holograms has a spatial frequency matched to spatially separate a particular mode from the single multiplexed light beam irrespective of the wavelength(s) of the single multiplexed light beam, wherein each spatial frequency has a substantially saw-tooth shaped phase function.

13. The method as claimed in claim 9, further comprising transmitting the single multiplexed beam from the first optical element to the second optical element.

14. The method as claimed in claim 9, wherein the method comprises the step of modal decomposition, wherein modal weightings of the de-multiplexed modes are determined so as to detect a signal for each mode.

15. The method as claimed in claim 1, further comprising one or both of the steps of:
   adjusting a phase function for each mode to correct for distortions and aberrations; and
   applying a linear grating across each mode and use only a first diffraction order thereof for each of the predetermined number of modes.

16. A method of optical communication, further comprising:
   receiving a single multiplexed light beam comprising a multiplex of a predetermined number of spatial modes per one or more wavelengths, wherein each of the predetermined number of spatial modes per one or more wavelengths have at least two spatial degrees of freedom;
   acting on the received single multiplexed light beam with a second optical element to de-multiplex the received single multiplexed light beam to constituent spatially separate de-multiplexed spatial modes in a simultaneous fashion and independent of the wavelength(s); and
   use the spatially separate de-multiplexed spatial modes as one or both of carrier channels and bits in a bit coding scheme, wherein the second optical element comprises a single hologram to de-multiplex the received single multiplexed light beam, wherein the single hologram is a superposition of a plurality of holograms corresponding to the predetermined number of spatial modes, wherein each hologram of the plurality of holograms has a spatial frequency matched to spatially separate a particular spatially separate de-multiplexed mode from the single multiplexed light beam irrespective of the wavelength(s) of the multiplexed light beam, wherein each spatial frequency has a substantially saw-tooth shaped phase function.

17. The method as claimed in claim 16, further comprising the step of modal decomposition, wherein modal weightings of the de-multiplexed modes are determined so as to detect a signal for each mode.

18. An optical communication system, wherein the optical communication system comprises:
   an optical transmitter comprising a first optical element, the optical transmitter being configured to:
      receive at least one incident light beam having one or more wavelengths; and
      act on the received at least one incident light beam with the first optical element to create a single multiplexed light beam comprising a multiplex of a predetermined number of modes per one or more of the wavelengths of the received at least one incident light beam, in a wavelength independent fashion, wherein each of the predetermined number of modes per one or more wavelengths have at least two spatial degrees of freedom; and
      transmit the single multiplexed light beam over one or more optical fibres or free space; and
   an optical receiver comprising a second optical element, the optical receiver being configured to:
      receive the single multiplexed light beam from the optical transmitter;
      act on the received single multiplexed light beam with the second optical element to de-multiplex the received single multiplexed light beam to constituent spatially separate de-multiplexed modes in a simultaneous fashion, independent of wavelength(s) of the single multiplexed light beam; and
      use the spatially separate de-multiplexed modes as one or both of carrier channels and bits in a bit coding scheme, wherein the first and second optical elements comprise a single hologram being a superposition of a plurality of holograms, wherein each of the plurality of holograms has a different carrier or spatial frequency corresponding to the predetermined number of modes to multiplex a light beam with the predetermined modes in the case of the first optical element and de-multiplex a light beam to the predetermined modes in the case of the second optical element in a wavelength independent manner, and wherein each carrier frequency has a substantially saw-tooth shaped phase function.

19. The system as claimed in claim 18, wherein the two spatial degrees of freedom of the spatial modes is two degrees of freedom in spatial pattern and are selected from a group consisting of radial and azimuthal indices of Laguerre Gaussian beams, and X and Y axis indices of Hermite-Gaussian beams in Cartesian symmetry.

20. The system as claimed in claim 18, wherein the at least one incident light beam is a data carrying light beam from a conventional source.

21. The system as claimed in claim 18, wherein the first and second optical elements are configured to apply a complex amplitude modulation code to the at least one incident and multiplexed light beams respectively to multiplex and de-multiplex the same respectively in a manner that is mode selective but independent of the wavelength of the at least one incident light beam.

22. The system as claimed in claim 18, further comprising a lens array disposed between the first and second optical elements configured at least to spatially separate the spatial modes and wavelengths in the Fourier plane.

23. The system as claimed in claim 18, further comprising a detector configured to receive the spatially separate de-multiplexed modes from the second optical element via a spatial filter and detect a signal associated with each spatially separate de-multiplexed mode by detecting a modulus of modal weighting coefficients found by modal decomposition of the received single multiplexed light beam.

24. The system as claimed in claim 18, wherein the first and second optical elements are selected from the group consisting of a diffractive optical element, an aspherical optical element, and a phase only spatial light modulator.

25. The system as claimed in claim 18, wherein one or both of the first and second optical elements are configured to perform one or both of the steps of:

adjusting a phase function for each spatially separate de-multiplexed mode to correct for distortions and aberrations; and applying a linear grating across each spatially separate de-multiplexed mode and use only a first diffraction order thereof for each of the predetermined number of modes.

* * * * *